(12) United States Patent
Kleinau

(10) Patent No.: US 6,658,335 B2
(45) Date of Patent: Dec. 2, 2003

(54) METHOD AND APPARATUS FOR MOTOR VELOCITY MEASUREMENT COMPENSATION IN ELECTRIC POWER STEERING DAMPING

(75) Inventor: Julie A. Kleinau, Bay City, MI (US)

(73) Assignee: Delphi Technologies, Inc., Troy, MI (US)

( * ) Notice: Subject to any disclaimer, the term of this patent is extended or adjusted under 35 U.S.C. 154(b) by 79 days.

(21) Appl. No.: 10/075,407

(22) Filed: Feb. 13, 2002

(65) Prior Publication Data

US 2003/0074120 A1 Apr. 17, 2003

Related U.S. Application Data

(60) Provisional application No. 60/328,662, filed on Oct. 11, 2001.

(51) Int. Cl.[7] .................... B62D 15/00; G05D 1/00; G06F 7/00; G06F 19/00
(52) U.S. Cl. .................... 701/41; 180/443; 180/446; 318/433; 318/434; 318/66; 318/67
(58) Field of Search .................. 701/41, 42; 180/443, 180/446, 412, 624, 6.2, 6.28; 318/432, 433, 805, 64, 434, 66

(56) References Cited

U.S. PATENT DOCUMENTS

| | | | |
|---|---|---|---|
| 4,869,335 A | * | 9/1989 | Takahashi .................. 180/412 |
| 5,719,766 A | | 2/1998 | Bolourchi et al. ..... 364/424.052 |
| 5,740,880 A | * | 4/1998 | Miller ......................... 180/446 |
| 5,919,241 A | | 7/1999 | Bolourchi et al. ............. 701/41 |
| 5,979,587 A | * | 11/1999 | Liubakka et al. ............. 180/446 |
| 6,129,172 A | * | 10/2000 | Yoshida et al. ............... 180/446 |
| 6,360,151 B1 | * | 3/2002 | Suzuki et al. .................. 701/41 |
| 6,530,269 B1 | * | 3/2003 | Colosky ....................... 73/118.1 |
| 6,570,352 B2 | * | 5/2003 | Hara et al. .................... 318/432 |
| 2002/0017885 A1 | * | 2/2002 | Endo ............................ 318/432 |

* cited by examiner

Primary Examiner—Thomas G. Black
Assistant Examiner—Ronnie Mancho
(74) Attorney, Agent, or Firm—Michael D. Smith

(57) ABSTRACT

A method for generating a compensated torque command signal to be applied to an electric power steering motor is disclosed. In an exemplary embodiment, the method includes generating an assist torque command signal responsive to a measured vehicle speed and an input steering torque signal. An assist dependent damping torque signal is generated, the assist dependent damping torque signal responsive to the assist torque command signal, the measured vehicle speed and a compensated motor velocity output value of the electric power steering motor. The assist dependent damping torque signal is then subtracted from the assist torque command signal.

54 Claims, 6 Drawing Sheets

METHOD AND APPARATUS FOR MOTOR VELOCITY MEASUREMENT COMPENSATION IN ELECTRIC POWER STEERING DAMPING

CROSS REFERENCE TO RELATED APPLICATIONS

This application claims the benefit of U.S. Provisional Application No. 60/328,662 filed Oct. 11, 2001, the contents of which are incorporated by reference herein in their entirety.

BACKGROUND

The present disclosure relates generally to automobile steering systems and, more particularly, to a method and apparatus for motor velocity measurement compensation in the damping of electric power assist steering systems.

In a vehicle equipped with electric power steering (EPS), a steering assist torque may be provided by an electric motor coupled to a steering column or shaft. Generally speaking, in such systems, a controller derives an assist torque signal, along with a "return to center" (i.e., neutral position) torque signal, and thereafter sums these torque signals to produce a motor command signal. The first of these torque signals provides the power steering boost torque, and the latter provides return to center bias torque. However, an EPS system further has a free rotational oscillation resonance associated therewith that, if left undamped, may not result in a crisp, controlled feel to the steering.

Accordingly, input-dependent active damping features have been provided with EPS systems to aid in the free control response of a vehicle. An example of such an active damping system is disclosed in U.S. Pat. No. 5,919,241 (the '241 patent), assigned to the assignee of the present application, and the contents of which are incorporated herein by reference. In the '241 patent, the active damping provides an active damping torque signal that is further summed along with the assist torque signal and the return to center torque signal to produce the motor command signal. In turn, the active damping torque signal is derived as a function of a filtered steering shaft position and a sensed vehicle velocity. A filtering means for generating the filtered steering shaft position includes amplitude and phase characteristics of a differentiator from 0 Hz through the resonant frequency of free rotational oscillation. At rotational oscillation frequencies greater than the resonant frequency of free rotational oscillation, the amplitude and phase lead characteristics are decreasing, relative to those of a differentiator.

Although subsequent improvements have been developed for active damping systems to further enhance system stability without compromising on-center feel, one particular shortcoming has been discovered in those systems wherein a motor velocity measurement is obtained by differentiating motor position. Because a differentiating position approach is an inherently numerically noisy approach, a velocity measurement disturbance results in a tactile torque disturbance in the handwheel, in addition to an audible disturbance.

SUMMARY

The above discussed and other drawbacks and deficiencies of the prior art are overcome or alleviated by a method for generating a compensated motor velocity output value for an electric power steering motor. In an exemplary embodiment, the method includes determining a first motor velocity value and a second motor velocity value. A measured vehicle speed is then compared to a determined vehicle speed range. If the measured vehicle speed exceeds the determined vehicle speed range, then the compensated motor velocity output value is set to the first motor velocity value, and if the measured vehicle speed is less than the determined vehicle speed range, then the compensated motor velocity output value is set to the second motor velocity value. However, if the measured vehicle speed is within the determined vehicle speed range, then the compensated motor velocity output value is a linearly blended value of the first motor velocity value and the second motor velocity value.

In a preferred embodiment, the first motor velocity value is determined by using a first number of motor positions in conjunction with a motor position signal, the second motor velocity value is determined by using a second number of motor positions in conjunction with the motor position signal. Preferably, the first number of motor positions is less than the second number of motor positions.

BRIEF DESCRIPTION OF THE DRAWINGS

Referring to the exemplary drawings wherein like elements are numbered alike in the several Figures.

DETAILED DESCRIPTION

Figure 1:
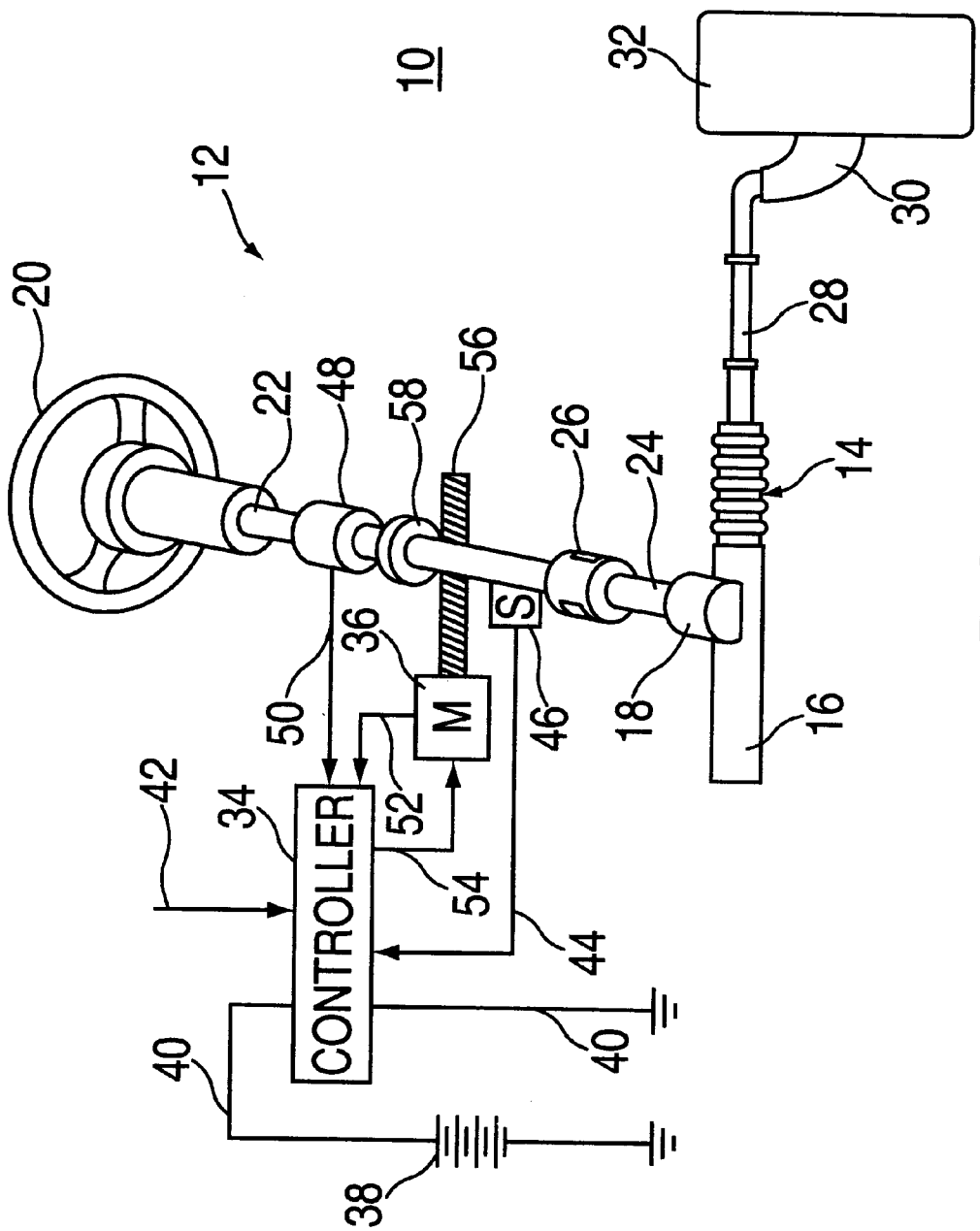
FIG. 1 is a schematic diagram of a vehicle provided with an exemplary electric power steering (EPS) system.

Referring initially to FIG. 1, there is shown a schematic diagram of a motor vehicle 10 provided with an exemplary electric power steering (EPS) system 12. The EPS system 12 may include a conventional rack and pinion steering mechanism 14, which includes a toothed rack 16 and a pinion gear (not shown) under a gear housing 18. As a steering input member (e.g., a steering wheel) 20 is turned, a steered member or upper steering shaft 22 turns a lower steering shaft 24 through a universal joint 26. In turn, the lower steering shaft 24 turns the pinion gear. The rotation of the pinion gear moves the rack 16, which then moves a pair of tie-rods 28 (only one shown) coupled to a pair of steering knuckles 30 (only one shown) to turn a pair of road wheels 32 (only one shown).

Electric power assist is provided through a controller 34 in conjunction with a power assist actuator, such as an electric motor 36. The controller 34 receives electric power from a vehicle electric power source 38 through a line 40. Inputs to the controller 34 include a signal 42 representative of the vehicle velocity, as well as a signal 44 representative of steering pinion gear angle from a column or shaft rotational position sensor 46. As the steering wheel 20 is turned, a torque sensor 48 senses the torque applied to steering wheel 20 by the vehicle operator and provides an input steering torque signal 50 to controller 34. In addition, as the rotor of motor 36 turns, motor position signals 52 for each phase are generated within motor 36 and are provided to the controller 34.

In response to the vehicle velocity, operator torque, steering pinion gear angle and rotor position signals received, controller 34 derives desired motor voltages and provides such voltages through a motor command signal 54 to motor 36. Thereby, the motor 36 supplies a torque assist to upper and lower steering shaft 22, 24 through a worm 56 and associated worm gear 58. If the torque sensor 48 is of the type that requires the upper steering shaft 22 to be separated at the sensor between upper and lower sections (allowing some range of rotational independence), both the rotational position sensor 44 and worm gear 58 are associated with the lower section of the steering shaft below torque sensor 48, as shown.

Figure 2:
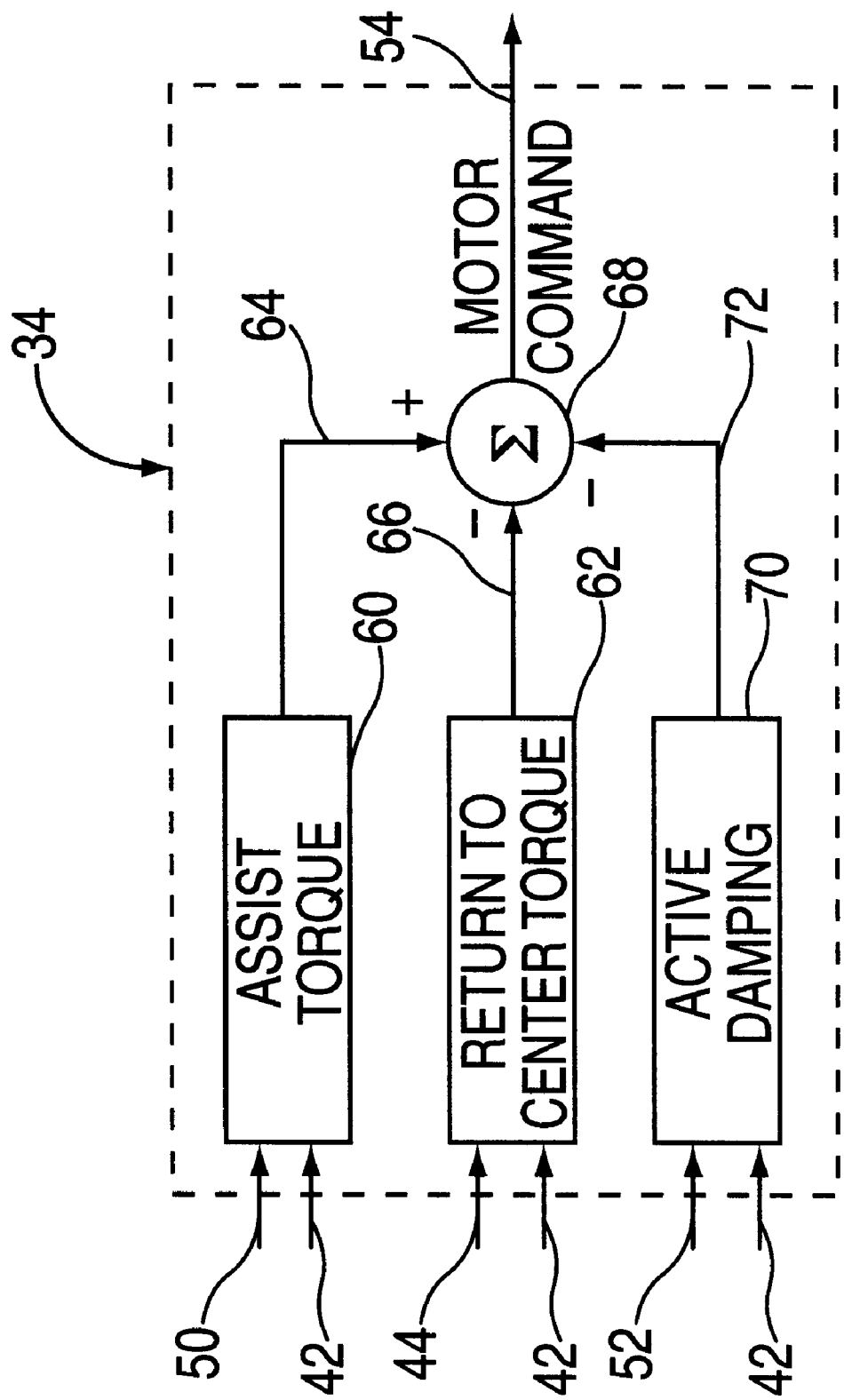
FIG. 2 is a block diagram of an existing active damping system associated with an EPS controller shown in FIG. 1.

Referring now to FIG. 2, there is shown a block diagram of an existing active damping system associated with the EPS controller 34 shown in FIG. 1. As described earlier, a desired assist torque is derived at block 60. The desired assist torque, in turn, determines a desired assist torque current that represents the amount of motor current to be commanded, specifically responsive to the inputs of input steering torque signal 50 and vehicle velocity signal 42. The desired assist torque current is outputted by block 60 through a command signal 64.

As also described earlier, a desired return to center torque is derived at block 62. The desired return to center torque thus determines the magnitude of a return to center torque current, and is responsive to the vehicle velocity signal 42 and the pinion gear angle signal 44. The desired return to center torque current is outputted by block 62 through a command signal 66. Signals 64 and 66 are inputted to summation block 68, wherein the magnitude of the return to center torque current command signal 66 is subtracted from the magnitude of the assist torque current command signal 64.

An active damping block 70 is also included in controller 34, in order to determine an active damping torque current command signal 72. Preferably, the active damping torque current command signal 72 is derived from the motor position signals 52 and the vehicle velocity signal 42, and is outputted to summation block 68. The magnitude of the active damping torque current command signal 72 is subtracted from the difference between the assist torque current command signal 64 and the return to center torque current command signal 66. Alternatively, however, the active damping block 70 may receive the pinion gear angle signal 44 rather than the motor position signal 52. In still an alternative embodiment, the return to center torque block 62 may be omitted altogether, since the vehicle chassis characteristics themselves provide a return to center torque.

Figure 3:
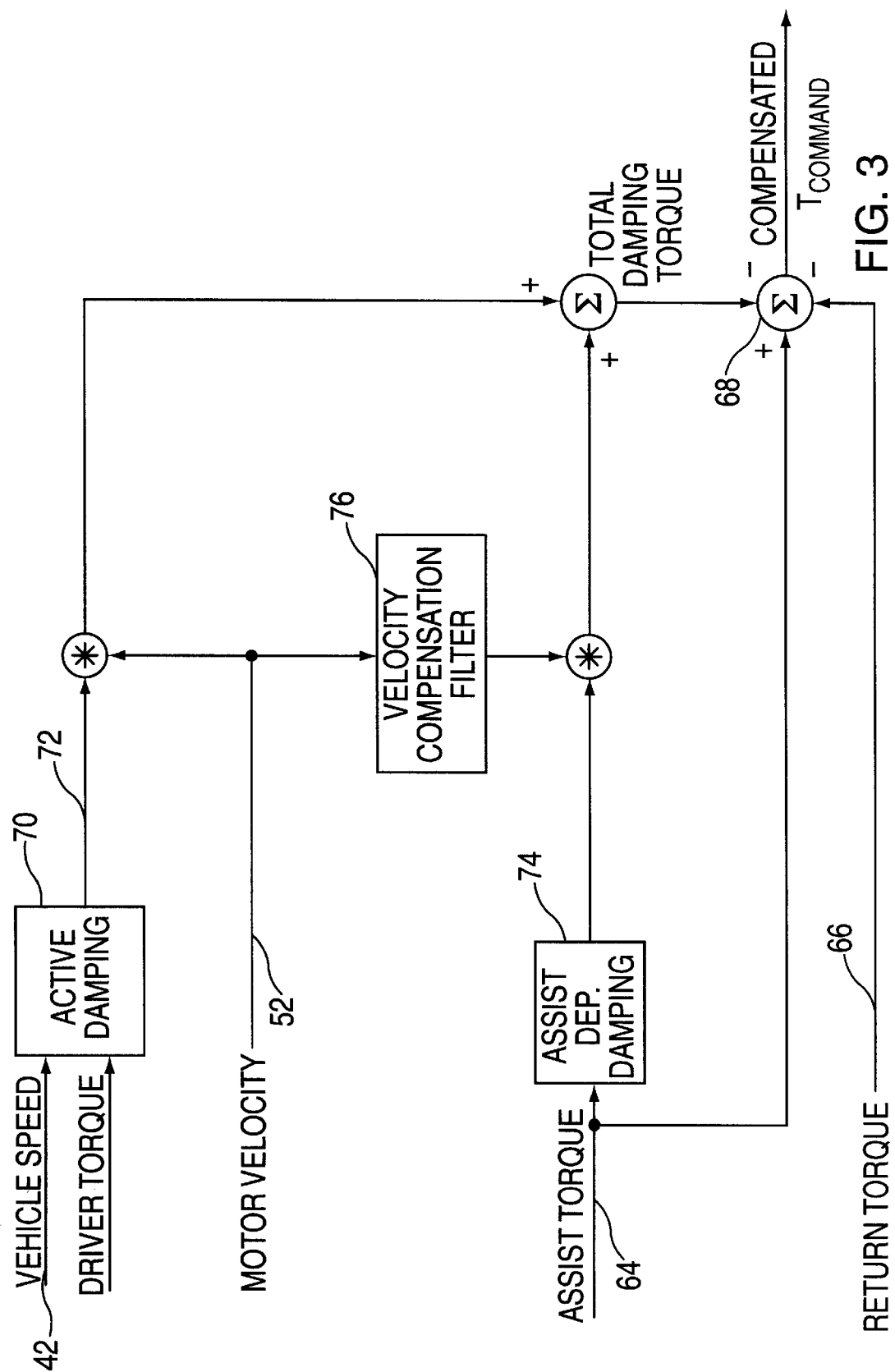
FIG. 3 is a block diagram of a modified active damping system, further providing for torque assist dependent damping and frequency dependent damping system.

Referring now to FIG. 3, there is shown a block diagram of an improved version of the existing active damping system of FIG. 2. In this embodiment, torque command or assist dependent damping, as well motor velocity frequency dependent damping, is further provided in the determination of a total damping torque. In the improved damping system, an assist dependent damping block 74 was added to aid in stability of the system without compromising on-center feel. By changing the amount of damping as a function of assist level, larger values of damping may be provided at higher assist torques, while lesser or no extra damping may be provided at low assist torques (such as encountered on-center). Thereby, the return ability and on-center feel of the system is prevented from being adversely affected. Additional details regarding assist dependent damping may be found in U.S. application Ser. No. 09/829,311, filed Apr. 9, 2001, assigned to the assignee of the present application, the contents of which are incorporated herein by reference.

In addition, a velocity compensation filter 76 was added to the motor velocity path and used in conjunction with the assist dependent damping block 74 in order to aid in stabilizing systems with analog velocity sensors. The velocity compensation filter 76 further improved stability, disturbance rejection, and on-center feel properties of the system. Filter 76 may include any general first, second, or higher order filter with appropriate characteristics. Additional details regarding the unity gain frequency dependent damping filter 76 may be found in U.S. Provisional Application Serial No. 60/297,066, filed Jun. 8, 2001, assigned to the assignee of the present application, the contents of which are incorporated herein by reference.

However, a limitation was discovered for systems in which the motor velocity measurement is obtained by differentiating position in that the tradeoffs between velocity disturbance rejection and on-center feel were unacceptable. Since the differentiating position approach for obtaining a measure of motor velocity is an inherently numerically noisy approach, this velocity measurement disturbance resulted in a tactile torque disturbance in the handwheel, as well as an audible disturbance. Although adding frequency dependent damping aids in this disturbance rejection, it also causes a sluggish on-center feel due to the added damping, even when leveraging the assist dependent damping. Since the velocity disturbances are most noticeable at static conditions (i.e., zero vehicle speed) and the on-center feel is most noticeable at non-static conditions, a vehicle speed dependent feature is now added to both the damping function and the position differentiating function.

Therefore, in accordance with an embodiment of the invention, there is disclosed a method and apparatus for motor velocity measurement compensation in the damping of electric power assist steering systems. Briefly stated, the method and apparatus include the ability to change the characteristics of a position differentiator for calculating a measure of motor velocity as vehicle speed changes. Generally speaking, the inclusion of position information over a longer time period in motor velocity calculation reduces the velocity measurement disturbance. In conjunction, the gain characteristics of the frequency dependent damping (block 76) also change with vehicle speed. This allows for the disturbance rejection vs. on-center feel tradeoff to be adjusted appropriately as vehicle speed changes.

Figure 4:
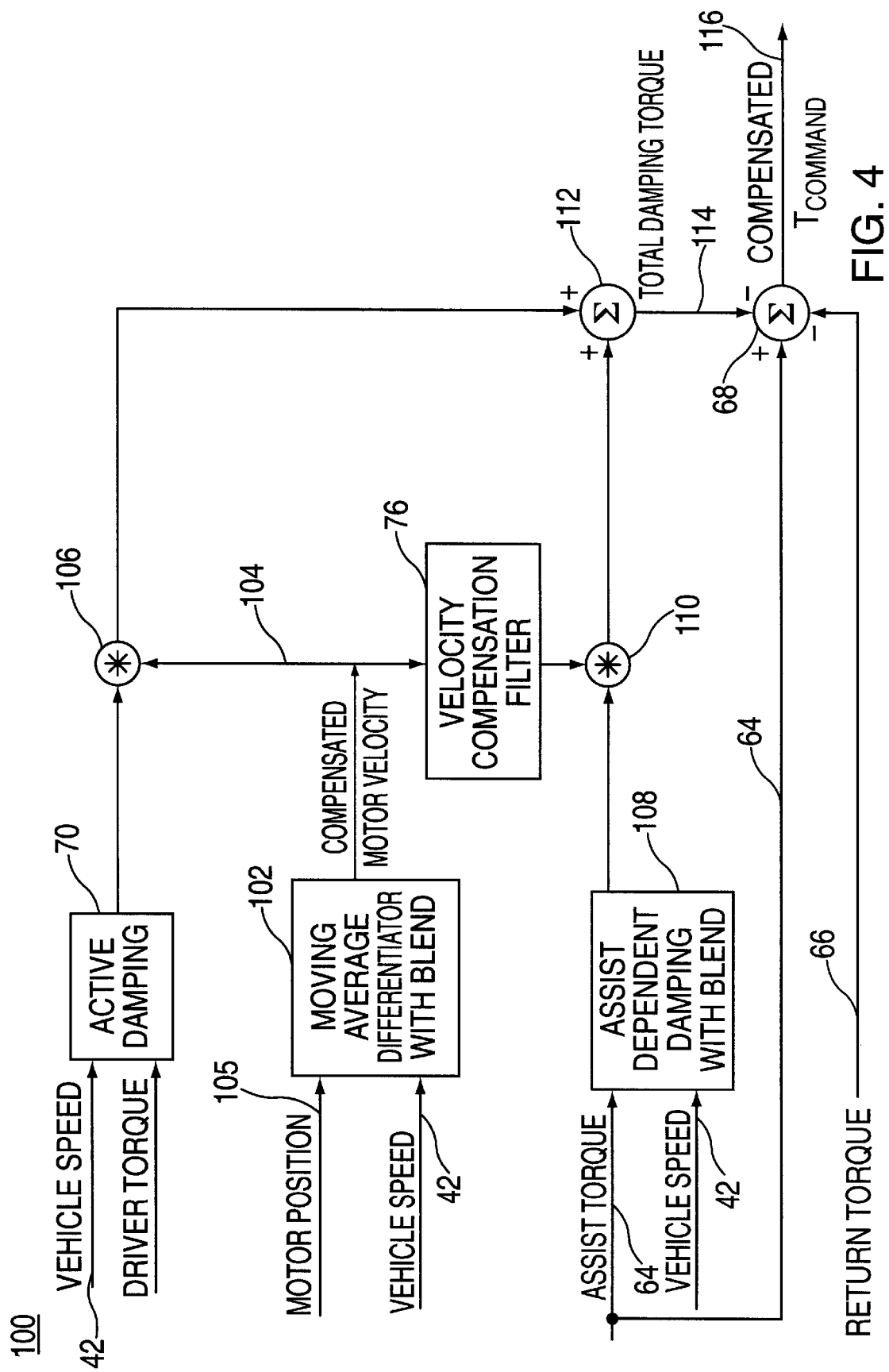
FIG. 4 is a block diagram of the damping system of FIG. 3, further including a method and apparatus for motor velocity measurement compensation by blending motor velocity values, in accordance with an embodiment of the invention.

An exemplary embodiment of a damping system 100 incorporating the novel method and apparatus is shown in FIG. 4. In addition to previously described elements, the system 100 further includes block 102 which generates a compensated motor velocity output value 104, as a function of motor position (through input of motor position signal 105) and vehicle speed (signal 42). As will be described hereinafter, block 102 includes a moving average filter that simultaneously computes two individual motor velocity values. Depending upon a determined vehicle speed, the resulting compensated motor velocity output value 104 is a linearly blended value between the two individual motor velocity values.

The compensated motor velocity output value 104 is inputted to the velocity compensation filter 76 (as described earlier), as well as to a multiplier 106 for multiplication with the output of active damping block 70. As is also described in greater detail hereinafter, the existing assist damping block 74 (in FIG. 3) is further enhanced with a similar, vehicle speed dependent blending function in block 108. The output block of 108 is multiplied with the output of velocity compensation filter 76 at multiplier 110. In turn, the output of multiplier 110 is added to the output of multiplier 106 at summing block 112 to produce a total damping torque signal 114. The total damping torque signal 114 is subtracted, along with the return to center torque 66, from the assist torque 64 at summing block 68 to produce the compensated motor command torque signal 116.

Figure 5:
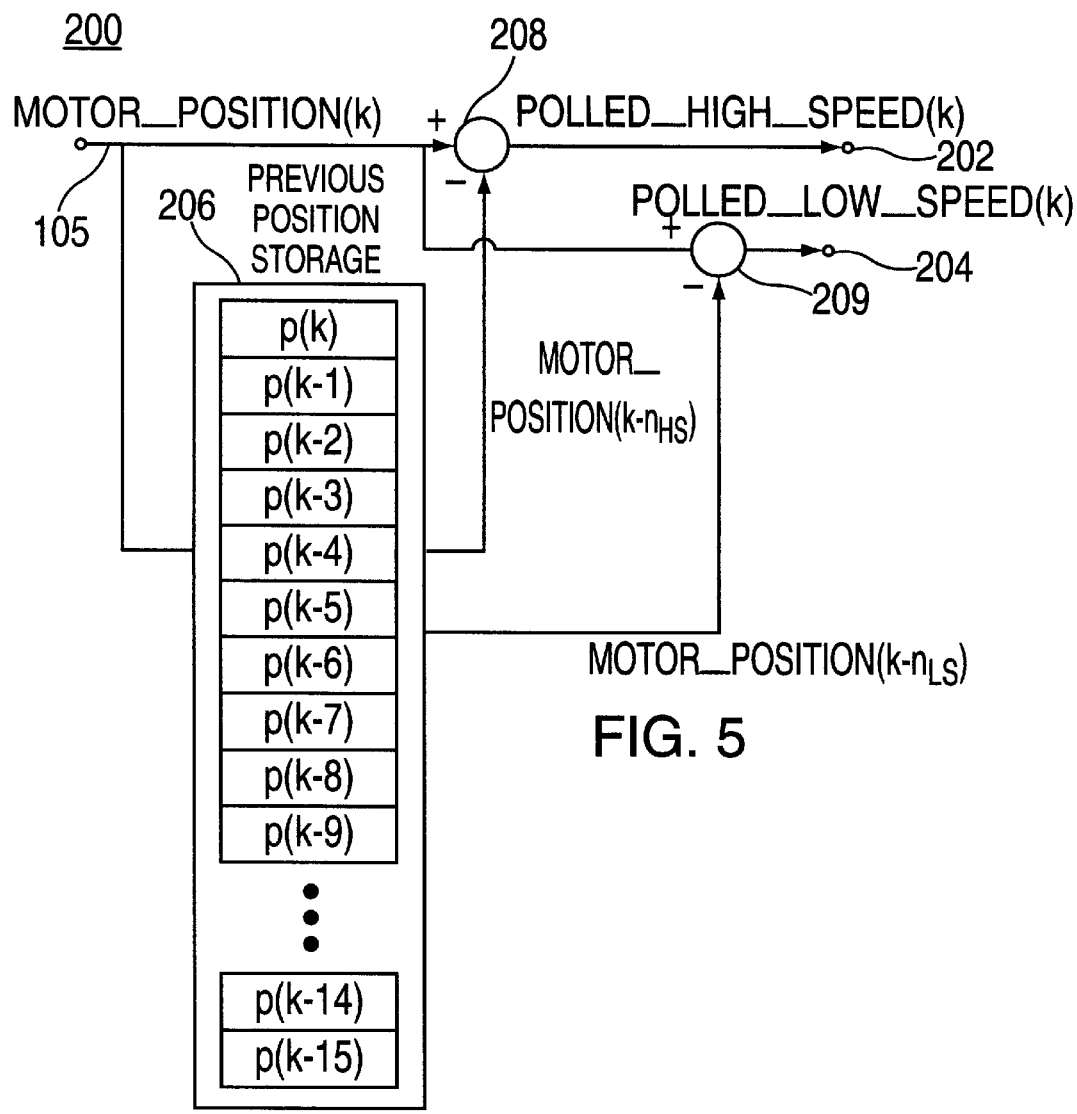
FIG. 5 is a block diagram illustrating an embodiment of a moving average filter implemented in FIG. 4.

Referring now to FIG. 5, there is shown a moving average filter implementation of a position differentiator 200 for determining a motor velocity. The position differentiator 200 is included within block 102 of FIG. 4. As opposed to a measuring device such as a tachometer or resolver (which directly measures motor velocity), a position differentiator measures a change in motor position over time to calculate the motor velocity. By averaging motor position over an extended time interval, the noise generated by the position differentiator is reduced. On the other hand, the larger the number of time intervals used in computing the average velocity, the longer the lag time in generating the velocity signal.

Accordingly, the moving average position differentiator 200 provides for the computation of two individual motor velocity values, hereinafter referred to as a polled high speed motor velocity value 202 and a polled low speed motor velocity value 204. The polled high speed motor velocity value 202 is generated from a first number ($n_{HS}$) of motor positions, while the polled low speed motor velocity value 204 is generated using a second number ($n_{LS}$) of motor positions. The number of motor positions used in both calculations is adjustable in conjunction with an output scaling factor (not shown) in order to maintain a constant gain vs. number of positions. Preferably, more positions are used in a static condition than in a rolling condition. Thus, $n_{LS}$ is greater than $n_{HS}$ in a preferred embodiment.

The calculation of the polled high speed motor velocity value 202 and the polled low speed motor velocity value 204 is understood with reference to FIG. 5. The motor position signal 105, which has a value denoted p(k) at a given sample k, is measured and stored in a memory storage device 206. The current motor position p(k) is stored along with previously measured positions at prior intervals p(k-1), p(k-2), . . . , etc. By way of example, an EPS assist motor may have 144 possible motor positions associated therewith that are sampled at a frequency of about 500 Hertz, or once every 2 milliseconds. The storage device 206 may store a determined number of previous motor positions (e.g., the current position p(k) and the previous 15 motor positions p(k-15)). It will be understood, however, that a different number of previous motor positions may be stored.

In the example illustrated, the polled high speed motor velocity value 202 is computed using an average of the most recent eight motor positions (i.e., the current motor position p(k) plus the seven previous motor positions p(k-1) through p(k-7)). Thus, a summing block 208 takes the difference between p(k) and p(k-7) to produce the polled high speed motor velocity value 202. The polled low speed motor velocity 204, in contrast, uses a greater number of motor positions, for example, the current motor position p(k) plus the nine previous motor positions p(k-1) through p(k-9). Another summing block 209 thus takes the difference between p(k) and p(k-9) to produce the polled low speed motor velocity value 204. Again, the number of motor positions used in the calculations may be adjusted according to system preferences.

Figure 6:
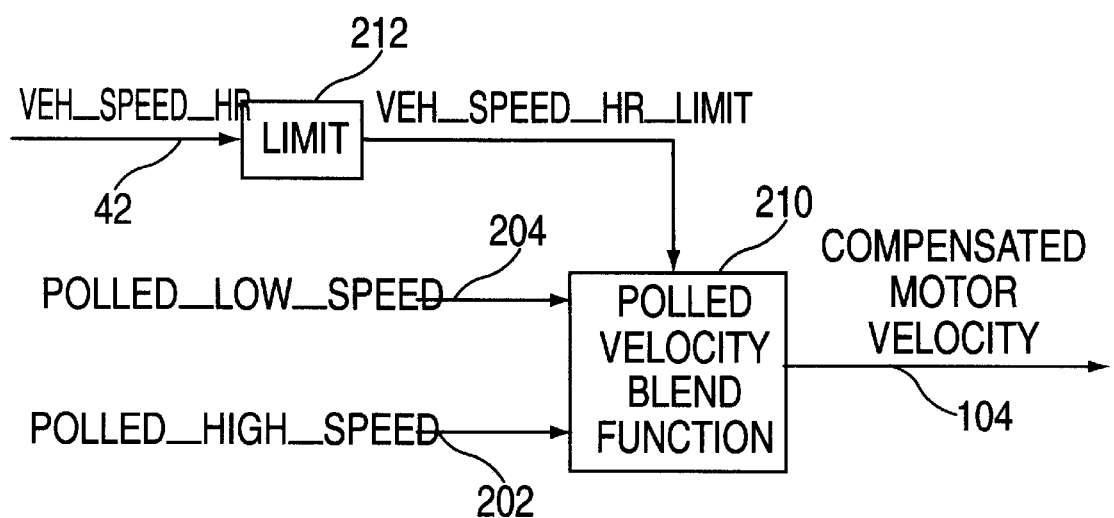
FIG. 6 is a block diagram illustrating the generation of a compensated motor velocity value, in accordance with FIGS. 4 and 5.

FIG. 6 is a block diagram which illustrates the two separately calculated motor velocity values (i.e., polled high speed motor velocity value 202 and polled low speed motor velocity value 204) being blended with a vehicle speed dependent blend function at block 210. A limiting block 212 may optionally be used in the vehicle speed path to truncate certain high vehicle speed values that are represented by digital signals having number of bits that exceed, for example, one byte of digital information. In this embodiment, two breakpoint vehicle speed calibrations are used. If the vehicle speed (from signal 42) is below breakpoint 1, only the polled low speed motor velocity value 204 is used as the compensated motor velocity output 104. If the vehicle speed is above breakpoint 2, only the high speed motor velocity variable is used as the compensated motor velocity output 104. However, for vehicle speeds falling in between breakpoints 1 and 2, the two motor velocity variables are blended together using a linearly interpolated vehicle speed blend factor ($\alpha$), which is a coefficient ranging from 1 to 0, depending upon vehicle speed.

In other words, in the present method, a vehicle speed range (i.e., the range of speeds between breakpoint 1 and breakpoint 2) is determined. If the vehicle speed exceeds the determined vehicle speed range, then the compensated motor velocity output value 104 is set to a first motor velocity value (i.e., the polled high speed motor velocity value 202). If the vehicle speed is less than the determined vehicle speed range, then the compensated motor velocity output value 104 is set to a second motor velocity value (i.e., the polled low speed motor velocity value 204). If the vehicle speed is within the determined vehicle speed range (i.e., greater than breakpoint 1 and less than breakpoint 2), the compensated motor velocity output value is a linearly blended value of the first motor velocity value and the second motor velocity value.

Figure 7:
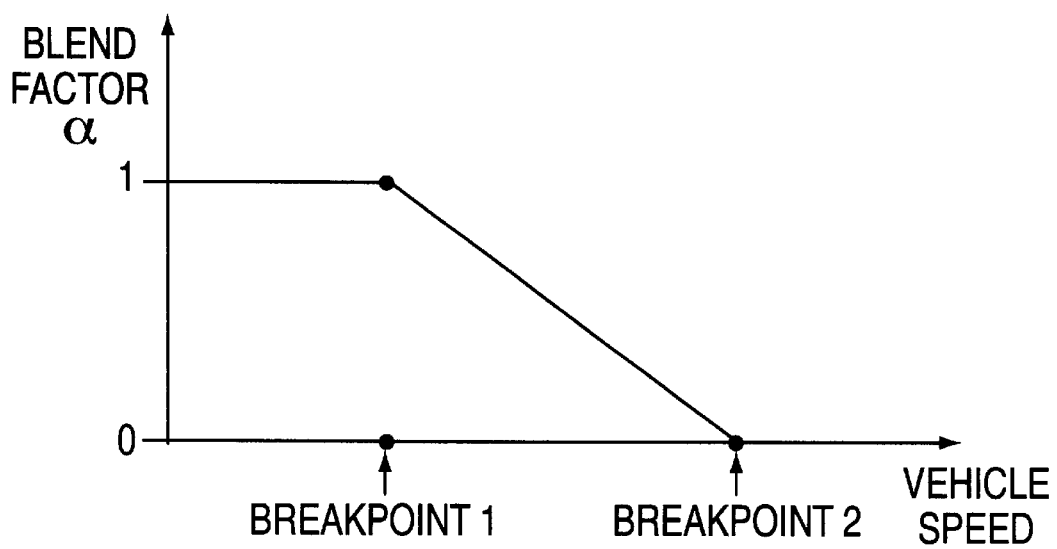
FIG. 7 is a graph illustrating the blend factor ($\alpha$) as a function of vehicle speed, the blend factor being applied in the generation of the compensated motor velocity value.

The blend function is illustrated in the graph of FIG. 7. As is shown, the blend factor $\alpha$ is 1 for vehicle speeds up to breakpoint 1, and 0 for vehicle speeds at breakpoint 2 and higher. In between breakpoint 1 and 2, $\alpha$ linearly decreases from 1 to 0. The polled velocity blend function at block 210, therefore, may be represented by the following equation:

$$\text{Compensated Motor Velocity} = (\text{Polled High Speed})(1-\alpha) + (\text{Polled Low Speed})(\alpha)$$

Figure 8:
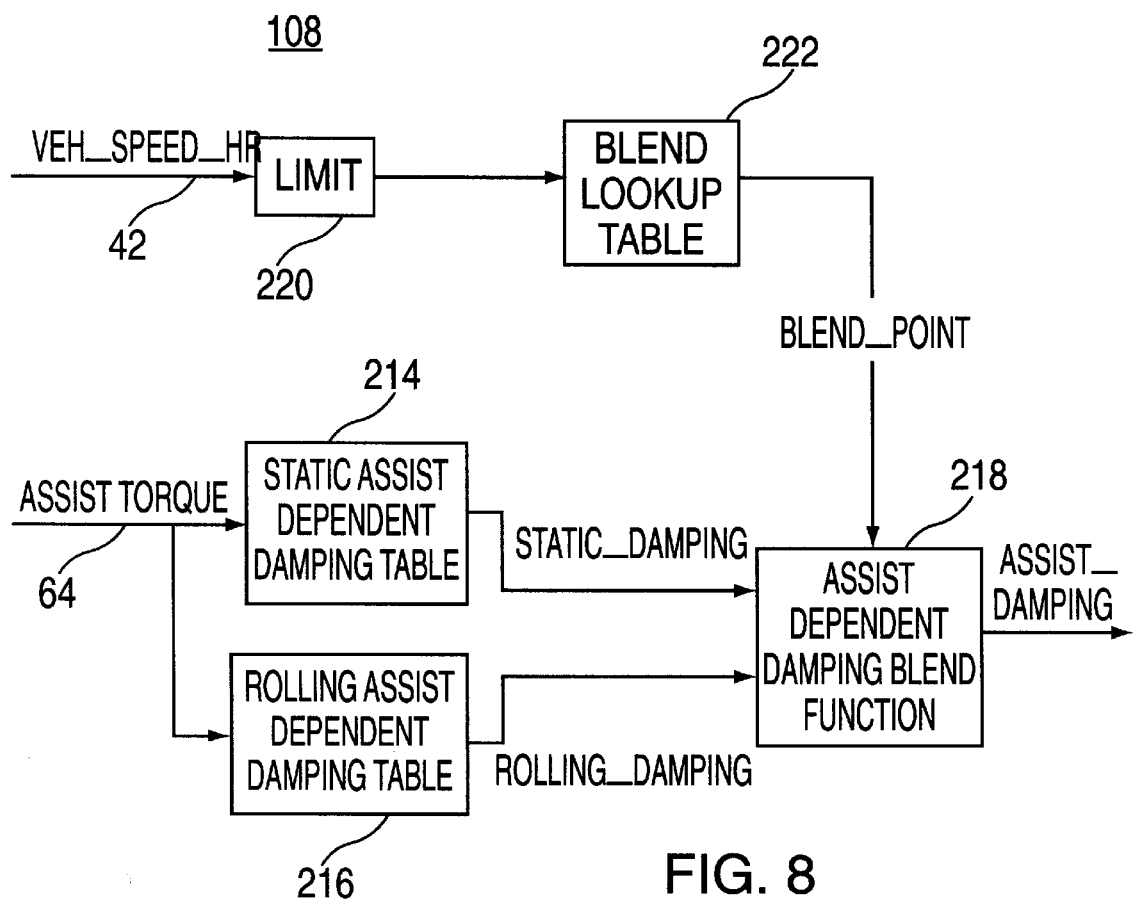
FIG. 8 is block diagram illustrating the use of a blend function in conjunction with assist dependent damping tables.

Finally, FIG. 8 illustrates the use of a similar blend function to enhance the assist torque damping block 108. In the assist dependent damping with blending, there are a pair of torque command dependent damping tables implemented. A static assist dependent damping table 214 and a rolling assist dependent damping table 216 both have the assist torque signal 64 as inputs thereto. The static assist dependent damping table 214 provides assist dependent damping at low vehicle speed, while the rolling assist dependent damping table 216 provides assist damping at higher vehicle speed. The outputs of the two damping tables are blended with an assist dependent damping function at block 218, similar to the one described in FIG. 6. The assist dependent damping function 218 is also dependent upon the vehicle speed input signal 42 which, in this path, may also be sent through a limiter 220 and a blend lookup table 222.

From the foregoing description, it will be appreciated that by implementing a moving average position differentiator 200 and blend functions (blocks 210 and 218), an active damping system (including assist damping features) that uses a position differentiator to calculate motor velocity may be improved by changing the characteristics of the position differentiator as a function of vehicle speed. At lower vehicle speeds, the disturbance rejection of noisy position differentiators is more desirable and hence a greater number of position averages may be used to reduce tactile torque disturbances in the handwheel, as well as audible noise. At higher vehicle speeds, on-center feel is more desirable than disturbance rejection and thus a lower number of position averages are used to reduce the lag in generating the output motor velocity signal.

In addition, the disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for generating a compensated motor velocity output value for an electric power steering motor, the method comprising:
    determining a first motor velocity value;
    determining a second motor velocity value;
    comparing a measured vehicle speed to a determined vehicle speed range; and
    if said measured vehicle speed exceeds said determined vehicle speed range, then the compensated motor velocity output value is set to said first motor velocity value;
    if said measured vehicle speed is less than said determined vehicle speed range, then the compensated motor velocity output value is set to said second motor velocity value; and
    if said measured vehicle speed is within said determined vehicle speed range, then the compensated motor velocity output value is a linearly blended value of said first motor velocity value and said second motor velocity value.

2. The method of claim 1, wherein said determined vehicle speed range lies between a first breakpoint (breakpoint 1) and a second breakpoint (breakpoint 2), said first and second breakpoints being selected vehicle speeds.

3. The method of claim 2, wherein if said measured vehicle speed is within said vehicle speed range, the compensated motor velocity output value is generated in accordance with the following equation:

$$\text{Compensated Motor Velocity} = (\text{Polled High Speed})(1-\alpha) + (\text{Polled Low Speed})(\alpha);$$

wherein;
    Compensated Motor Velocity represents the compensated motor velocity output value, Polled High Speed represents said first motor velocity value, Polled Low Speed represents said second motor velocity value, and $\alpha$ represents a blend factor.

4. The method of claim 3, wherein:
    $\alpha$ is equal to 1 when said measured vehicle speed is less than or equal to said first breakpoint;
    $\alpha$ is equal to 0 when said measured vehicle speed is greater than or equal to said second breakpoint; and
    $\alpha$ linearly decreases from 1 to 0 in between said first breakpoint and said second breakpoint.

5. The method of claim 1, wherein:
    said first motor velocity value is determined by using a first number of motor positions in conjunction with a motor position signal; and
    said second motor velocity value is determined by using a second number of motor positions in conjunction with said motor position signal.

6. The method of claim 5, wherein said first number of motor positions is less than said second number of motor positions.

7. The method of claim 6, further comprising retrieving a current motor position and a plurality of previous motor positions from a storage device.

8. A method for generating a damping torque signal to be applied to an electric power steering motor, the method comprising:
    inputting an assist torque signal to a first assist dependent damping table;
    inputting said assist torque signal to a second assist dependent damping table; and
    depending upon a measured vehicle speed, blending outputs from said first and second assist dependent damping tables, thereby producing an assist damping value;
    wherein said assist damping value is used, along with a motor velocity value, to generate the damping torque signal.

9. The method of claim 8, wherein:
    said first assist dependent damping table comprises a static assist dependent damping table; and
    said second assist dependent damping table comprises a rolling assist dependent damping table.

10. A method for generating a compensated torque command signal to be applied to an electric power steering motor, the method comprising:

generating an assist torque command signal, said assist torque command signal responsive to a measured vehicle speed and an input steering torque signal;

generating an assist dependent damping torque signal, said assist dependent damping torque signal responsive to said assist torque command signal, said measured vehicle speed and a compensated motor velocity output value of the electric power steering motor; and subtracting said assist dependent damping torque signal from said assist torque command signal.

11. The method of claim 10, further comprising:

generating an active damping torque signal, said active damping torque signal responsive to said measured vehicle speed and said compensated motor velocity output;

generating a total damping torque signal, said total damping torque signal comprising the sum of said active damping torque signal and said assist dependent damping torque signal; and subtracting said total damping torque signal from said assist torque command signal.

12. The method of claim 11, further comprising:

generating a return to center torque signal, said return to center torque signal responsive to said measured vehicle speed and a steering angle signal; and subtracting both said total damping torque signal and said return to center torque signal from said assist torque command signal.

13. The method of claim 12, wherein said compensated motor velocity output value is generated by:

determining a first motor velocity value;

determining a second motor velocity value;

comparing said measured vehicle speed to a determined vehicle speed range; and if said measured vehicle speed exceeds said determined vehicle speed range, then said compensated motor velocity output value is set to said first motor velocity value;

if said measured vehicle speed is less than said determined vehicle speed range, then said compensated motor velocity output value is set to said second motor velocity value; and if said measured vehicle speed is within said determined vehicle speed range, then said compensated motor velocity output value is a linearly blended value of said first motor velocity value and said second motor velocity value.

14. The method of claim 13, wherein said determined vehicle speed range lies between a first breakpoint (breakpoint 1) and a second breakpoint (breakpoint 2), said first and second breakpoints being selected vehicle speeds.

15. The method of claim 14, wherein if said measured vehicle speed is within said vehicle speed range, said compensated motor velocity output value is generated in accordance with the following equation:

Compensated Motor Velocity=(Polled High Speed)(1−α)+(Polled Low Speed)(α);

wherein;
Compensated Motor Velocity represents said compensated motor velocity output value, Polled High Speed represents said first motor velocity value, Polled Low Speed represents said second motor velocity value, and α represents a blend factor.

16. The method of claim 15, wherein:

α is equal to 1 when said measured vehicle speed is less than or equal to said first breakpoint;

α is equal to 0 when said measured vehicle speed is greater than or equal to said second breakpoint; and α linearly decreases from 1 to 0 in between said first breakpoint and said second breakpoint.

17. The method of claim 13, wherein:

said first motor velocity value is determined by using a first number of motor positions in conjunction with a motor position signal; and said second motor velocity value is determined by using a second number of motor positions in conjunction with said motor position signal.

18. The method of claim 13, wherein said first number of motor positions is less than said second number of motor positions.

19. The method of claim 18, further comprising retrieving a current motor position and a plurality of previous motor positions from a storage device.

20. The method of claim 12, wherein generating said assist dependent damping torque signal further comprises:

inputting said assist torque command signal to a first assist dependent damping table;

inputting said assist torque command signal to a second assist dependent damping table; and depending upon a measured vehicle speed, blending outputs from said first and second assist dependent damping tables, thereby producing an assist damping value;

wherein said assist damping value is used, along with a motor velocity value, to generate the damping torque signal.

21. The method of claim 20, wherein:

said first assist dependent damping table comprises a static assist dependent damping table; and said second assist dependent damping table comprises a rolling assist dependent damping table.

22. A controller for an electric power steering system, comprising:

means for determining a first motor velocity value of an electric motor;

means for determining a second motor velocity value of said electric motor;

means for comparing a measured vehicle speed to a determined vehicle speed range; and means for generating a compensated motor velocity output value of said electric motor, wherein
if said measured vehicle speed exceeds said determined vehicle speed range, then said compensated motor velocity output value is set to said first motor velocity value; and
if said measured vehicle speed is less than said determined vehicle speed range, then said compensated motor velocity output value is set to said second motor velocity value; and
if said measured vehicle speed is within said determined vehicle speed range, then said compensated motor velocity output value is a linearly blended value of said first motor velocity value and said second motor velocity value.

23. The controller of claim 22, wherein said determined vehicle speed range lies between a first breakpoint (breakpoint 1) and a second breakpoint (breakpoint 2), said first and second breakpoints being selected vehicle speeds.

24. The controller of claim 23, wherein if said measured vehicle speed is within said vehicle speed range, the compensated motor velocity output value is generated in accordance with the following equation:

Compensated Motor Velocity=(Polled High Speed)(1−α)+(Polled Low Speed)(α);

wherein;
Compensated Motor Velocity represents the compensated motor velocity output value, Polled High Speed represents said first motor velocity value, Polled Low Speed represents said second motor velocity value, and α represents a blend factor.

25. The controller of claim 24, wherein:
α is equal to 1 when said measured vehicle speed is less than or equal to said first breakpoint;
α is equal to 0 when said measured vehicle speed is greater than or equal to said second breakpoint; and
α linearly decreases from 1 to 0 in between said first breakpoint and said second breakpoint.

26. The controller of claim 22, wherein:
said first motor velocity value is determined by using a first number of motor positions in conjunction with a motor position signal; and
said second motor velocity value is determined by using a second number of motor positions in conjunction with said motor position signal.

27. The controller of claim 26, wherein said first number of motor positions is less than said second number of motor positions.

28. The controller of claim 27, wherein a current motor position and a plurality of previous motor positions are retrieved from a storage device.

29. The controller of claim 22, further comprising:
means for inputting an assist torque signal to a first assist dependent damping table;
means for inputting said assist torque signal to a second assist dependent damping table; and
depending upon a measured vehicle speed, means for blending outputs from said first and second assist dependent damping tables, thereby producing an assist damping value;
wherein said assist damping value is used, along with a motor velocity value, to generate the damping torque signal.

30. The controller of claim 28, wherein:
said first assist dependent damping table comprises a static assist dependent damping table; and
said second assist dependent damping table comprises a rolling assist dependent damping table.

31. A storage medium, comprising:
a machine readable computer program code for generating a compensated torque command signal to be applied to an electric power steering motor; and
instructions for causing a computer to implement a method, the method further comprising:
generating an assist torque command signal, said assist torque command signal responsive to a measured vehicle speed and an input steering torque signal;
generating an assist dependent damping torque signal, said assist dependent damping torque signal responsive to said assist torque command signal, said measured vehicle speed and a compensated motor velocity output value of the electric power steering motor; and
subtracting said assist dependent damping torque signal from said assist torque command signal.

32. The storage medium of claim 31, wherein the method further comprises:
generating an active damping torque signal, said active damping torque signal responsive to said measured vehicle speed and said compensated motor velocity output;
generating a total damping torque signal, said total damping torque signal comprising the sum of said active damping torque signal and said assist dependent damping torque signal; and
subtracting said total damping torque signal from said assist torque command signal.

33. The storage medium of claim 32, wherein the method further comprises:
generating a return to center torque signal, said return to center torque signal responsive to said measured vehicle speed and a steering angle signal; and
subtracting both said total damping torque signal and said return to center torque signal from said assist torque command signal.

34. The storage medium of claim 33, wherein said compensated motor velocity output value is generated by:
determining a first motor velocity value;
determining a second motor velocity value;
comparing said measured vehicle speed to a determined vehicle speed range; and
if said measured vehicle speed exceeds said determined vehicle speed range, then said compensated motor velocity output value is set to said first motor velocity value;
if said measured vehicle speed is less than said determined vehicle speed range, then said compensated motor velocity output value is set to said second motor velocity value; and
if said measured vehicle speed is within said determined vehicle speed range, then said compensated motor velocity output value is a linearly blended value of said first motor velocity value and said second motor velocity value.

35. The storage medium of claim 34, wherein said determined vehicle speed range lies between a first breakpoint (breakpoint 1) and a second breakpoint (breakpoint 2), said first and second breakpoints being selected vehicle speeds.

36. The storage medium of claim 35, wherein if said measured vehicle speed is within said vehicle speed range, said compensated motor velocity output value is generated in accordance with the following equation:

Compensated Motor Velocity=(Polled High Speed)(1−α)+(Polled Low Speed)(α);

wherein;
Compensated Motor Velocity represents said compensated motor velocity output value, Polled High Speed represents said first motor velocity value, Polled Low Speed represents said second motor velocity value, and α represents a blend factor.

37. The storage medium of claim 36, wherein:
α is equal to 1 when said measured vehicle speed is less than or equal to said first breakpoint;
α is equal to 0 when said measured vehicle speed is greater than or equal to said second breakpoint; and
α linearly decreases from 1 to 0 in between said first breakpoint and said second breakpoint.

38. The storage medium of claim 34, wherein:
said first motor velocity value is determined by using a first number of motor positions in conjunction with a motor position signal; and
said second motor velocity value is determined by using a second number of motor positions in conjunction with said motor position signal.

39. The storage medium of claim 38, wherein said first number of motor positions is less than said second number of motor positions.

40. The storage medium of claim 39, wherein a current motor position and a plurality of previous motor positions are retrieved from a storage device.

41. The storage medium of claim 33, wherein generating said assist dependent damping torque signal further comprises:
inputting said assist torque command signal to a first assist dependent damping table;
inputting said assist torque command signal to a second assist dependent damping table; and
depending upon a measured vehicle speed, blending outputs from said first and second assist dependent damping tables, thereby producing an assist damping value;
wherein said assist damping value is used, along with a motor velocity value, to generate the damping torque signal.

42. The storage medium of claim 41, wherein:
said first assist dependent damping table comprises a static assist dependent damping table; and
said second assist dependent damping table comprises a rolling assist dependent damping table.

43. A computer data signal, comprising:
code configured to cause a processor to implement a method for generating a compensated torque command signal to be applied to an electric power steering motor, the method further comprising:
generating an assist torque command signal, said assist torque command signal responsive to a measured vehicle speed and an input steering torque signal;
generating an assist dependent damping torque signal, said assist dependent damping torque signal responsive to said assist torque command signal, said measured vehicle speed and a compensated motor velocity output value of the electric power steering motor; and
subtracting said assist dependent damping torque signal from said assist torque command signal.

44. The computer data signal of claim 43, wherein the method further comprises:
generating an active damping torque signal, said active damping torque signal responsive to said measured vehicle speed and said compensated motor velocity output;
generating a total damping torque signal, said total damping torque signal comprising the sum of said active damping torque signal and said assist dependent damping torque signal; and
subtracting said total damping torque signal from said assist torque command signal.

45. The computer data signal of claim 44, wherein the method further comprises:
generating a return to center torque signal, said return to center torque signal responsive to said measured vehicle speed and a steering angle signal; and
subtracting both said total damping torque signal and said return to center torque signal from said assist torque command signal.

46. The computer data signal of claim 45, wherein said compensated motor velocity output value is generated by:
determining a first motor velocity value;
determining a second motor velocity value;
comparing said measured vehicle speed to a determined vehicle speed range; and
if said measured vehicle speed exceeds said determined vehicle speed range, then said compensated motor velocity output value is set to said first motor velocity value;
if said measured vehicle speed is less than said determined vehicle speed range, then said compensated motor velocity output value is set to said second motor velocity value; and
if said measured vehicle speed is within said determined vehicle speed range, then said compensated motor velocity output value is a linearly blended value of said first motor velocity value and said second motor velocity value.

47. The computer data signal of claim 46, wherein said determined vehicle speed range lies between a first breakpoint (breakpoint 1) and a second breakpoint (breakpoint 2), said first and second breakpoints being selected vehicle speeds.

48. The computer data signal of claim 47, wherein if said measured vehicle speed is within said vehicle speed range, said compensated motor velocity output value is generated in accordance with the following equation:

$$\text{Compensated Motor Velocity} = (\text{Polled High Speed})(1-\alpha) + (\text{Polled Low Speed})(\alpha);$$

wherein;
Compensated Motor Velocity represents said compensated motor velocity output value, Polled High Speed represents said first motor velocity value, Polled Low Speed represents said second motor velocity value, and α represents a blend factor.

49. The computer data signal of claim 48, wherein:
α is equal to 1 when said measured vehicle speed is less than or equal to said first breakpoint;
α is equal to 0 when said measured vehicle speed is greater than or equal to said second breakpoint; and
α linearly decreases from 1 to 0 in between said first breakpoint and said second breakpoint.

50. The computer data signal of claim 46, wherein:
said first motor velocity value is determined by using a first number of motor positions in conjunction with a motor position signal; and
said second motor velocity value is determined by using a second number of motor positions in conjunction with said motor position signal.

51. The computer data signal of claim 50, wherein said first number of motor positions is less than said second number of motor positions.

52. The computer data signal of claim 51, wherein a current motor position and a plurality of previous motor positions are retrieved from a storage device.

53. The computer data signal of claim 45, wherein generating said assist dependent damping torque signal further comprises:
inputting said assist torque command signal to a first assist dependent damping table;

inputting said assist torque command signal to a second assist dependent damping table; and depending upon a measured vehicle speed, blending outputs from said first and second assist dependent damping tables, thereby producing an assist damping value;

wherein said assist damping value is used, along with a motor velocity value, to generate the damping torque signal.

54. The computer data signal of claim 53, wherein:

said first assist dependent damping table comprises a static assist dependent damping table; and said second assist dependent damping table comprises a rolling assist dependent damping table.

* * * * *